Figure 1:
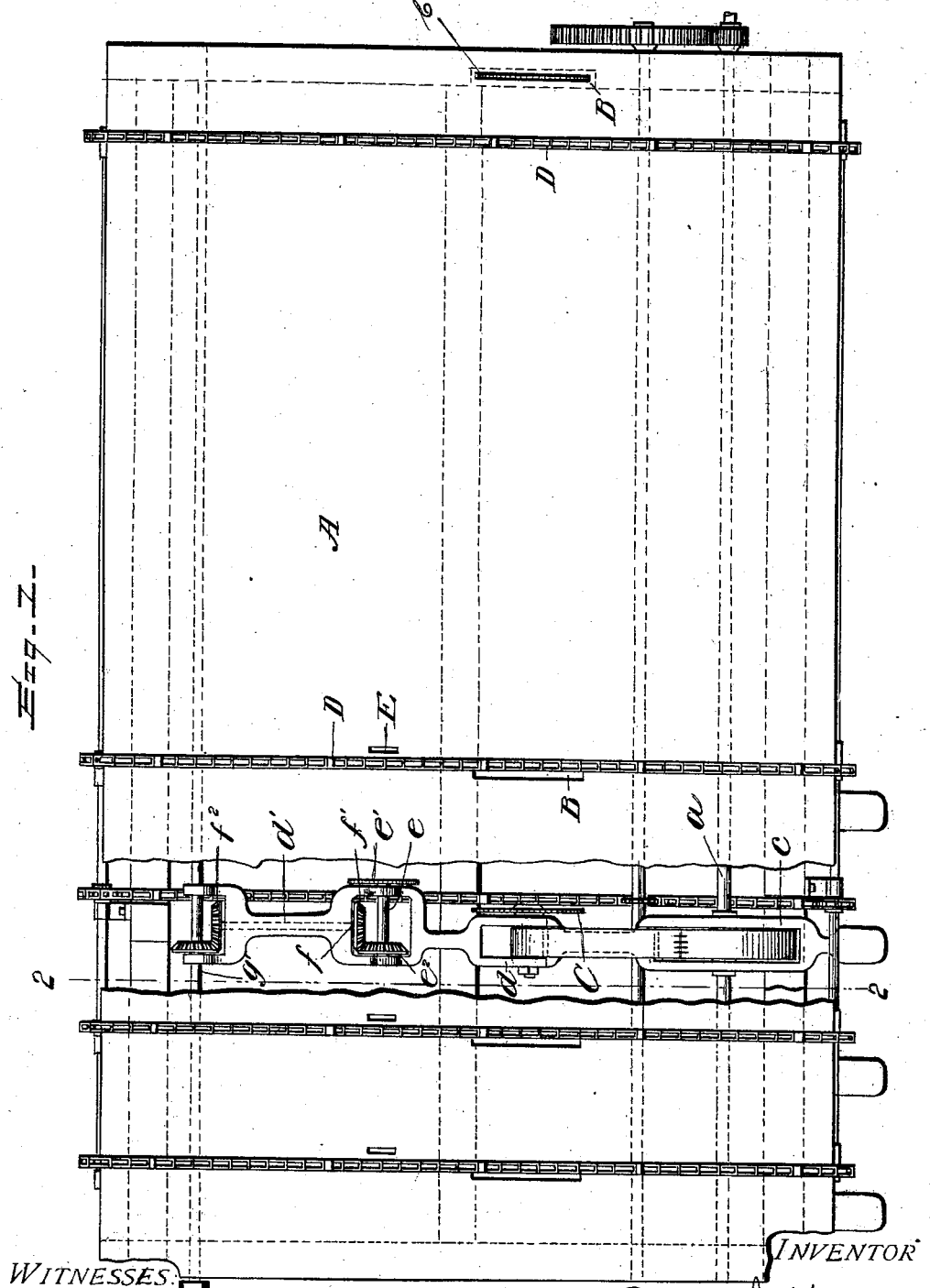

No. 694,405. Patented Mar. 4, 1902.
B. G. MOSS.
LUMBER MEASURER.
(Application filed June 21, 1901.)

(No Model.) 2 Sheets—Sheet 1.

WITNESSES
L. C. Hills
J. K. Moore

INVENTOR
Beverly G. Moss
BY Whitaker & Prevost
His Attorneys

No. 694,405. Patented Mar. 4, 1902.
B. G. MOSS.
LUMBER MEASURER.
(Application filed June 21, 1901.)
(No Model.) 2 Sheets—Sheet 2.
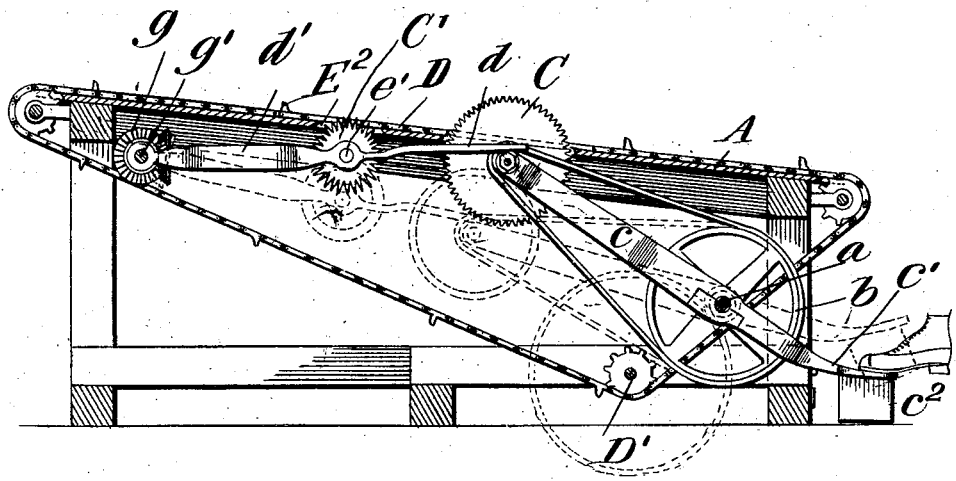
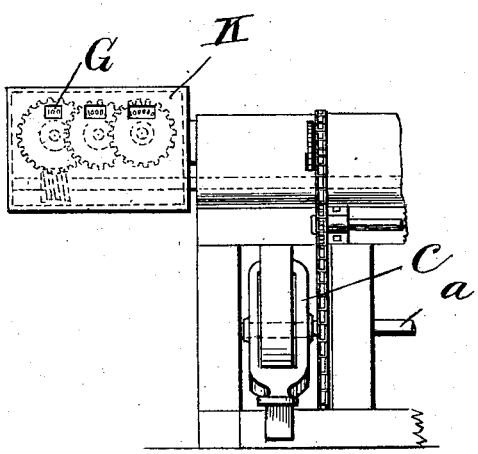
WITNESSES:
INVENTOR

UNITED STATES PATENT OFFICE.

BEVERLY G. MOSS, OF WASHINGTON, NORTH CAROLINA.

LUMBER-MEASURER.

SPECIFICATION forming part of Letters Patent No. 694,405, dated March 4, 1902.

Application filed June 21, 1901. Serial No. 65,501. (No model.)

*To all whom it may concern:*

Be it known that I, BEVERLY G. MOSS, a citizen of the United States, residing at Washington, in the county of Beaufort and State of North Carolina, have invented certain new and useful Improvements in Lumber-Measurers; and I do hereby declare the following to be a full, clear, and exact description of the invention, such as will enable others skilled in the art to which it appertains to make and use the same.

My invention relates to lumber-measurers as applied to trimmers and like devices, and consists in the novel features of construction and combination of parts hereinafter described, reference being had to the accompanying drawings, which illustrate one form in which I have contemplated embodying my invention, and said invention is fully disclosed in the following description and claims.

Referring to the drawings, Figure 1 is a top plan view of a trimmer provided with my device, the table being broken away to show the gearing. Fig. 2 is a section on line 2 2, Fig. 1; and Fig. 3 is a partial front view of the end of the trimmer, showing the measuring device attached thereto.

In the drawings, A designates the table, which is supported upon any suitable framework.

D designates the conveying-chains, which are operated by the shaft $D'$ so as to move over the face of the table in unison to carry the lumber to be operated upon to the saws, which project above the surface of the table.

B designates the openings in the table, through which the saws project or may be made to project.

Mounted in any suitable bearings secured to the framework of the machine is the shaft $a$, extending the whole length of the machine. At the right-hand end of the machine is placed the stationary saw, mounted in any suitable stationary bearing secured to the frame and extending through one of the openings B above the face of the table. This saw is operated from the shaft $a$ by any suitable connecting-gearing, such as belt and pulley or spur-gear. The machine is also provided with a number of other saws movable into and out of position, as desired. The manner of mounting one of these saws and its connected devices is shown in the drawings, and as each of said saws is mounted and driven in the same manner and has associated with it substantially the same parts a description of one will serve as a description for all.

Upon the main shaft $a$, which carries the large pulley $b$, is swiveled a saw-carrying frame $c$. One end of this frame is provided with a foot-tread $c'$ and counterweight $c^2$, while the other is equipped with a small pulley mounted on a cross-shaft with the saw C. A bifurcated arm $d$ extends from a star-wheel frame $d'$ in the rear of the saw and rests on the end portion of said saw-carrying frame $c$. This star-wheel frame $d'$ is swiveled to the long shaft $g'$ and is provided with a cross-shaft $e$, on which is rigidly secured the star-wheel $e'$ and the beveled pinion $e^2$. A shaft $f$ is mounted on or in and extends longitudinally of said frame $d'$ and has two beveled pinions $f'$ $f^2$ keyed thereto, one of which, $f'$, gears with the beveled pinion $e^2$ on the cross-shaft $e$, and the other meshes with a beveled pinion $g$, which is keyed to the long shaft $g'$, running the length of the machine and operating a register K, provided with registering devices G.

Normally the saw and its connected star-wheel rest in the position shown in dotted lines in Fig. 2, and the same are thrown into operation by the operator when desired by placing his foot upon the treadle $c'$, which will serve to bring the saw and star-wheel into the position shown in full lines in the same figure. When this is done, the saw will be brought into position to cut the board to be trimmed the length desired. The star-wheel will also project sufficiently above the upper edge of the carrying-chains to engage the under surface of the board and be revolved thereby in extent equal to the width of such board. It is to be noted that the star-wheel extends upward through the table a little to the right of the saw to secure its engagement with the main portion of the board. In the present instance I have shown a machine provided with four of these movably-mounted saws and star-wheels; but a machine may be provided with any number, as may be desired, from one upward.

The star-wheels above referred to are of different sizes in order that when boards pass over them the registering devices of the measuring mechanism may be set forward the proper proportional distance to indicate the number of feet in the board actuating that particular wheel. It will be readily seen from the construction and arrangement of said star-wheels and their gearing that when one of them is in operation the others are operated thereby; but since they are not in an operative position they have no effect upon the measuring mechanism.

The operation of the machine is as follows: The operator will place a board on the table, so as to be engaged by the conveying-chains, one end of the board being in the desired position to enable the stationary saw C' to trim it, and the operator will throw up into operative position one of the movable saws, which will trim or cut off the other end of the board to the best advantage. As the movable saw moves up into operative position it will also lift its connected star-wheel, so that as the board is carried forward past the saws by the feeding or carrying chains it will traverse the star-wheel, which is of such size as to rotate the shaft $g'$ the required amount to register the number of feet of lumber in the board after it is trimmed.

What I claim, and desire to secure by Letters Patent, is—

1. In a trimmer and like woodworking-machine the combination with a saw and mechanism for throwing it into and out of operative position, of a register, devices connected with said register and with said saw, whereby said register will be operated by the lumber fed to said saw, when said saw is in operative position, substantially as described.

2. In a trimmer and like woodworking-machine the combination with a saw and mechanism for throwing it into and out of operative position, of a register, a movable device operatively connected with the register, devices connecting said movable device with said saw, for moving the device into and out of the path of the lumber, as the saw is moved into and out of operative position, substantially as described.

3. In a trimmer, the combination with a fixed saw, of a movable saw, normally out of operative position, mechanism for moving said movable saw into operative position, a registering device, a movable device adapted to be operated by the lumber, connected with said register, and connections between said movable device and the mechanism for moving said movable saw, for throwing said movable device into and out of operative position with said movable saw, substantially as described.

4. In a trimmer, the combination with a fixed saw of two or more movable saws normally out of operative position, a register, actuating means for said register connected with each movable saw whereby the moving of any one of the movable saws into operative position brings the actuating devices of the register into position to be operated by the lumber cut by said saw, substantially as described.

5. In a lumber-trimming machine, the combination with swinging frame having a saw mounted therein, said saw being normally out of position, of a register operative devices therefor including a star-wheel, said operative devices being connected for joint movement with the swinging saw-frame, whereby the moving of the movable saw into operative position brings the star-wheel into position to be actuated by the lumber cut by said saw, substantially as described.

6. In a lumber-trimming device, the combination with the main frame of the machine, of a movable or swinging frame mounted on said frame, a saw journaled in said movable frame, a register, a star-wheel for operating said register mounted in a swinging support connected with the said saw-support, whereby the moving of said saw-support to place the said saw in operative position causes the star-wheel to swing into position to be actuated by the lumber cut by said saw, substantially as described.

7. In a lumber-trimming device, the combination with a series of movable saws normally out of operative position, a register having an actuating mechanism for each saw including a star-wheel, each of said star-wheels being normally out of operative position and connected with devices for moving one of said saws, whereby the moving of one of the said saws into operative position brings the connected star-wheel of the measuring device into position to be actuated by the lumber cut by said saw, substantially as described.

8. In a lumber-trimming device, the combination with a series of movable saws normally out of position, of a register, a shaft for actuating said register, a series of star-wheels one for each saw connected to said shaft to operate the same, said star-wheels being normally out of operative position and connected severally with said movable saws and each adapted to be moved into operative position with its appropriate saw, substantially as described.

9. In a lumber-trimmer, the combination with the stationary saw, and the movable saws, of a register, operating devices therefor including a star-wheel for each movable saw, each of said star-wheels being located between the movable saw with which it is associated and the said stationary saw, substantially as described.

10. In a lumber-trimmer, the combination with a stationary saw, a series of movable saws, and independent devices for throwing each of said movable saws into and out of operative position, of a register, a series of movable devices connected therewith, each adapted to be engaged by the lumber to move the register a different distance, one of said movable devices being located adjacent to each saw, and mechanism connecting each of said movable devices with the devices connected with its adjacent and corresponding movable saw, for moving said movable device into and out of operation with its corresponding saw, substantially as described.

11. In a lumber-trimmer, the combination with a stationary saw, a series of movable saws, and independent devices for throwing said movable saws into and out of operative position, of a register, a series of rotary devices of different diameters operatively connected with said register and adapted to engage the lumber when in operative position, one of said rotary devices being movably mounted adjacent to each movable saw, and devices for throwing each of said rotary devices into and out of operative position simultaneously with its adjacent movable saw, substantially as described.

In testimony whereof I affix my signature in the presence of two witnesses.

BEVERLY G. MOSS.

Witnesses:
F. A. MOSS,
J. B. FOWLE.